(12) United States Patent
Ichizawa (10) Patent No.: US 8,804,138 B2
(45) Date of Patent: Aug. 12, 2014

(54) COATING DIMENSION MEASURING APPARATUS

(71) Applicant: Yokogawa Electric Corporation, Musashino (JP)

(72) Inventor: Yasushi Ichizawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 13/755,416

(22) Filed: Jan. 31, 2013

(65) Prior Publication Data

US 2013/0201493 A1 Aug. 8, 2013

(30) Foreign Application Priority Data

Feb. 3, 2012 (JP) ................. 2012-021574

(51) Int. Cl.
*G01B 11/14* (2006.01)
*G01B 11/04* (2006.01)
*G01B 11/00* (2006.01)

(52) U.S. Cl.
CPC .............. *G01B 11/00* (2013.01); *G01B 11/046* (2013.01); *G01B 11/043* (2013.01)
USPC ........................................................ 356/625

(58) Field of Classification Search
CPC .......... H04N 1/00567; H04N 1/00681; H04N 1/00602; H04N 1/00716; G01B 11/24
See application file for complete search history.

(56) References Cited

U.S. PATENT DOCUMENTS

| 8,122,846 | B2* | 2/2012 | Stiblert et al. ................ 118/300 |
| 8,587,844 | B2* | 11/2013 | Itoh et al. ..................... 358/475 |
| 2005/0134638 | A1* | 6/2005 | Suzuki ........................... 347/37 |
| 2009/0141115 | A1* | 6/2009 | Inoue et al. ................... 347/242 |
| 2010/0060902 | A1* | 3/2010 | Wornson et al. .............. 356/601 |
| 2012/0019875 | A1* | 1/2012 | Hoover et al. ................ 358/474 |
| 2012/0081539 | A1* | 4/2012 | Ichizawa et al. ............... 348/95 |
| 2012/0194791 | A1* | 8/2012 | Duss et al. ..................... 355/53 |

FOREIGN PATENT DOCUMENTS

| JP | 2002-042789 A | 2/2002 |
| JP | 2004-148534 A | 5/2004 |

* cited by examiner

*Primary Examiner* — Michael P Stafira (74) *Attorney, Agent, or Firm* — Westerman, Hattori, Daniels & Adrian, LLP (57) ABSTRACT

A coating dimension measuring apparatus may include: a camera that is positioned at a prescribed position distanced from a sheet to capture an image of a coating dimension of the sheet; a roller configured to transport the sheet; a scale that is disposed along a lengthwise direction of the roller to perform numerical calibration of the coating dimension; a scale holding unit configured to hold the scale over the roller, the scale holding unit being disposed so as to enable free insertion and removal of the scale.

13 Claims, 5 Drawing Sheets

COATING DIMENSION MEASURING APPARATUS

BACKGROUND OF THE INVENTION

1. Field of the Invention

The present invention relates to a coating dimension measurement apparatus that measures the dimension of a coating onto a sheet-like base material. Specifically, the present invention relates to a coating dimension measurement apparatus that performs coating dimension measurement that facilitates calibration.

Priority is claimed on Japanese Patent Application No. 2012-021574, filed Feb. 3, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a process of manufacturing process, for example, a capacitor electrode or a battery electrode, a material (coating material) for achieving particular electrical characteristics is painted (coated) onto a base material sheet (hereinafter, referred to as a sheet). In this case, although there are cases in which the coating material is coated over the entire surface of the sheet, in the case in which the coating material has a high cost or in which the coating material must not be coated onto the edge of the sheet, coating is done onto only a particular part of the sheet.

Such coating is known by terms such as partial coating, block coating, and pattern coating.

It is necessary to measure the coated part dimensions (width and length), and when coating both sides of a sheet, it is necessary to measure the dimensions (width and length) on both the front side and the rear side thereof.

Figure 4:
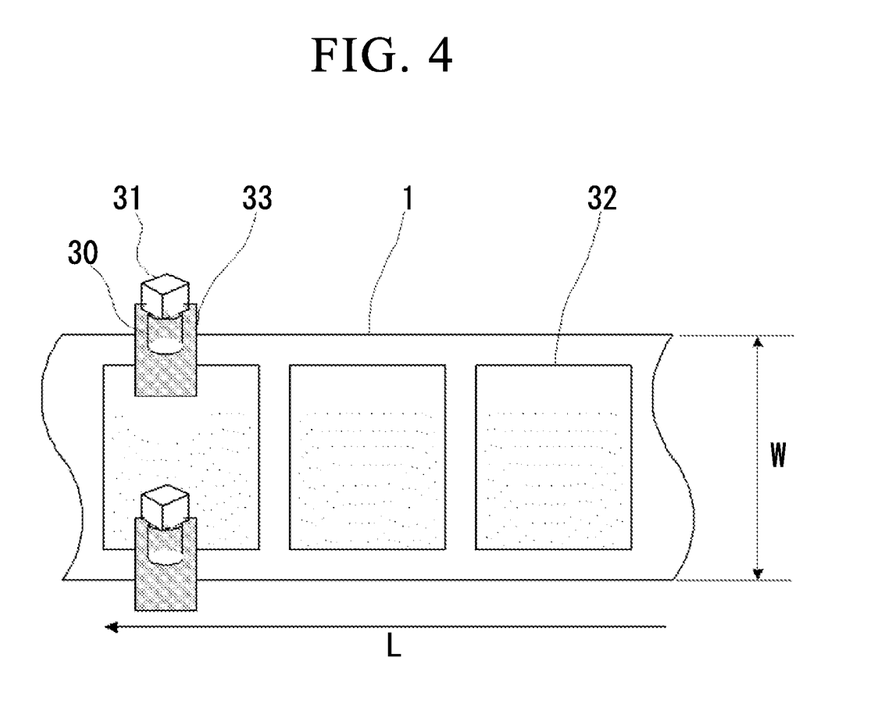
FIG. 4 is a conceptual drawing showing an example of a coating pattern measurement apparatus in accordance with the related art.

FIG. 4 is a conceptual drawing showing an example of a coating pattern measurement apparatus in accordance with the related art. FIG. 4 shows the case of measuring a coating pattern by using cameras. In FIG. 4, a sheet 1 is supported by a transport roller (not shown), and is transported along a coating line at a constant speed. In the example of FIG. 4, the sheet 1 is moved to the left direction L. The sheet 1 has a sheet width W. A plurality of cameras 31 in which a lens 30 is mounted (two shown in FIG. 4) are installed over the coating line, and measure the coating dimensions on the sheet 1.

The sheet 1 moves to a determined direction (the left direction L in FIG. 4). Therefore, it is not necessary for the cameras 31 to have two-dimensional information when measuring the sheet 1. Therefore, line sensor cameras, which are arranged on a line that is perpendicular to the movement direction of the sheet 1 (the left direction L), are often used as imaging elements of the cameras 31. Of course, area sensor cameras that have two-dimensional information may alternatively be used as the image elements. In the example of FIG. 4, the cameras 31 measure a part of interest 33 in the coated part 32.

In the case of such a coating dimension measurement system, the following performance is required.

The sheet 1 is ideally transported past the same position on the transport line. When this occurs, depending upon the location of the coating line, the sheet 1 does not pass the completely same position, and varies up/down and left/right. The position where the sheet 1 is transported is referred to as a pass line. For example, if there is no support between transport rollers, there are cases in which the sheet 1 will vibrate up and down (with the pass line varying). It is necessary to prevent the position variation from influencing the measurement of the coating dimensions.

Figure 5A:
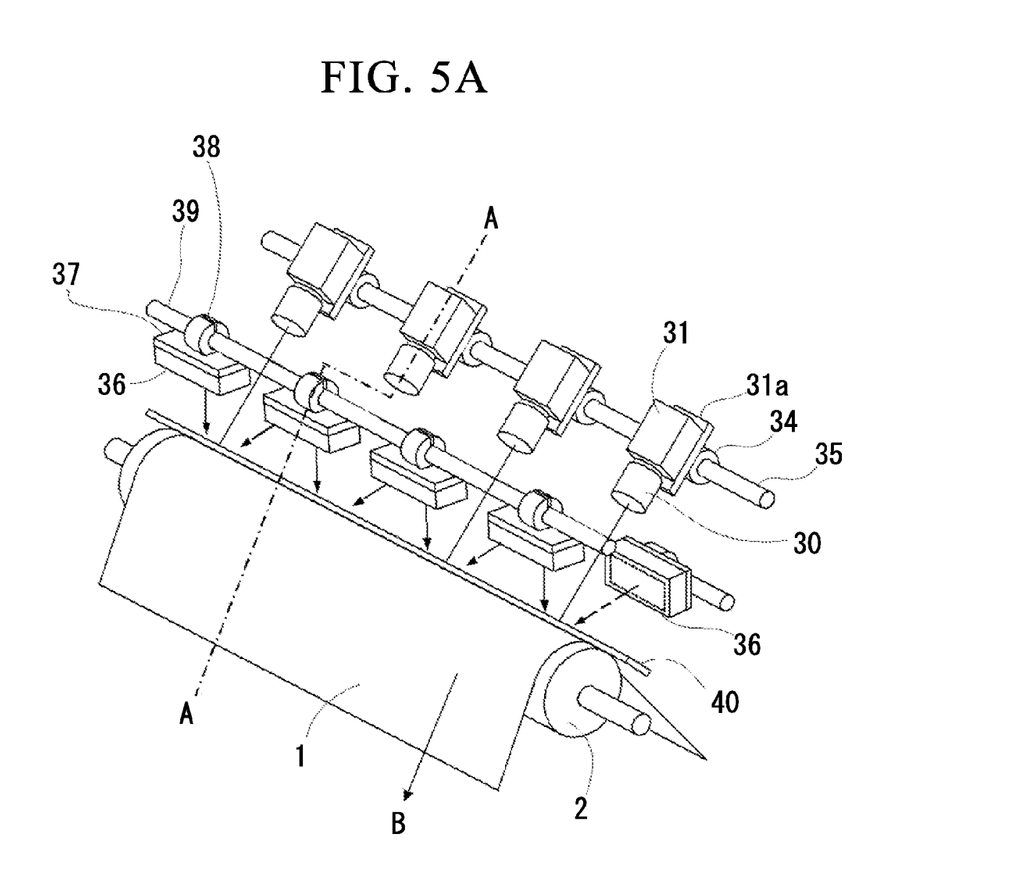
FIG. 5A is an oblique view of main parts showing another example of a coating pattern measurement apparatus in which imaging is done above a transport roller in accordance with the related art.
Figure 5B:
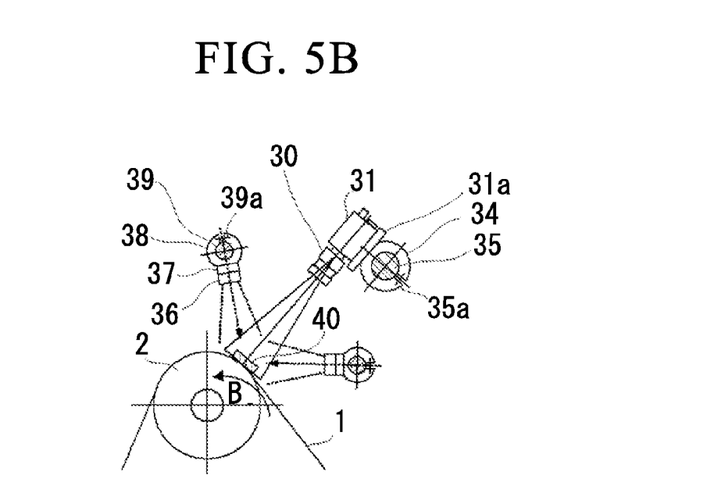
FIG. 5B is a cross-sectional view along the line A-A in FIG. 5A.

FIG. 5A is an oblique view of the main parts showing another example of a coating pattern measurement apparatus in which imaging is done above a transport roller in accordance with the related art. FIG. 5B is a cross-sectional view along the line A-A in FIG. 5A. In this coating pattern measurement apparatus, imaging is done above a transport roller at a position at which the sheet 1 does not vibrate up and down.

In FIG. 5A and FIG. 5B, the sheet 1 is supported by a transport roller 2 (hereinafter referred to simply as a roller 2). The sheet 1 is transported in the direction of the arrow B along the outer periphery of the roller 2. The cameras 31 each of which has a lens 30 are fixed to camera holding plates 31a. The camera holding plates 31a are fixed to setting collars 34 that are formed to be cylindrical. A shaft (camera holding shaft) 35 is inserted through the cylindrical parts of the setting collars 34. The cameras 31 are slidably and rotatably supported along the shaft 35, to which the cameras 31 are held by screws 35a (refer to FIG. 5B).

Illuminators 36 are fixed to illumination holding plates 37. The illumination holding plates 37 are held to the setting collars 38. A shaft (illuminator holding shaft) 39 is inserted into the cylindrical parts of the setting collars 38. The illuminators 36 is slidably and rotatably supported along the shaft 39 and held by the screws 39a (refer to FIG. 5B).

A scale (straight scale) 40 is disposed along the lengthwise direction of the roller 2 and is formed to be at least longer than the width W of the sheet 1, having a length along which all of the optical systems capture at one time. The cameras 31 capture the shape and the edges of the coating formed on the surface of the sheet 1. The cameras 31 are disposed at positions so that clear images are obtained. The illuminator 36 is disposed to give such angle that shadows of the illuminators 36 to the left and right of the imaging directions do not fall on the imaging positions.

In the above-described constitution, each of the optical systems are fixed by clamping to the shafts 35 and 39 via setting collars 34 and 38, thereby establishing the relative positioning between the sheet 1 and the cameras 31. As shown in FIG. 5A and FIG. 5B, the sheet 1 that is transported by the roller 2 is imaged when over the roller 2, and the dimension measurement is done from the captured image.

In FIG. 5A, there is an arrangement of four sets of image capturing optical systems and illumination optical systems disposed in a direction that is perpendicular to the flow direction of the sheet 1.

In general, the measurement of a coating width is done by positioning cameras 31 and capturing images at parts of interest (for example, a foil edge or coated part edge) the position of the parts of interest being determined from the position of the captured image. When this is done, if it is not possible with one camera to capture the overall image while maintaining the required resolution, a plurality of cameras 31, such as shown in FIG. 5A, are held at positions enabling image capture at the parts of interest, images of the parts of interest are captured with the required resolution, and the positions thereof are determined.

Because the distances between the cameras is fixed, it is possible to know the coated width from each of the positions. In this case, regardless of whether there is one or are a plurality of cameras, it is necessary to do numerical calibration so that, when a camera is positioned, it is possible to know what imaged position corresponds to how many millimeters. The most general method of numerical calibration is that of placing a scale (straight scale) 40 at a position equivalent to the sheet 1, as shown in FIG. 5A and FIG. 5B, and capturing images thereof to perform numerical calibration.

In cases in which the apparatus is such that it does not permit the location of a scale 40 at an equivalent position, the sheet 1 is measured by a width-measuring apparatus, and the obtained measurement value and a sample thereof are measured by a width-measuring apparatus having a higher accuracy by a different measurement method and one that can be correlated, that value being used as the basis for compensation and determination of the width.

Although there is no influence by the camera attitude or image capturing range if the overall range is captured by one camera, if a plurality of cameras 31 are used, the relative positions of each become important, and even if the cameras 31 are held fixed, there is no guarantee that loose screws or inadvertent contact will not disturb the fixed positions. For this reason, it is necessary to perform periodic checks.

Given this situation, consider the case in which calibration is performed by placing a scale 40 on the roller 2. Because damage to the roller 2 cannot be permitted, bringing a metal scale 40 up against the roller 2 is a very delicate process. Also, because the scale 40 is relatively long, the actual task is one of two persons supporting the scale 40 as the camera 31 is operated to capture images, making the task quite a troublesome one.

However, when the width-measuring apparatus is installed in tight quarters on a production line, this becomes an even more difficult task. Even if such a task is performed, the scale 40 is distanced from the surface of the roller 2 by the amount of its thickness (1 to 2 mm), this being optically magnified, leading to measurement errors.

Because of the above-noted situation, although numerical calibration is done at the time of camera installation, periodic calibration is not done that often. Although this is not a problem on a production line that always produces the same product, in which case the sheet 1 does not change, on a production line in which the product changes frequently, camera movement, numerical calibration, and the like become troublesome.

Additionally, even for one and the same product, if calibration is not done for a long period of time, it is difficult to characterize the production as having traceability. If the camera position or the lens position happens to change just a bit, it can result in products that are out-of-specification.

Accordingly, in the case of performing calibration by placing a scale on a roller, the present invention provides a coating dimension measurement apparatus that not only does not damage the roller, but also simplifies the calibration task.

SUMMARY

A coating dimension measuring apparatus may include: a camera that is positioned at a prescribed position distanced from a sheet to capture an image of a coating dimension of the sheet; a roller configured to transport the sheet; a scale that is disposed along a lengthwise direction of the roller to perform numerical calibration of the coating dimension; a scale holding unit configured to hold the scale over the roller, the scale holding unit being disposed so as to enable free insertion and removal of the scale.

The scale may be disposed outside an image capturing range when the camera captures an image of the sheet, and is disposed on the roller only when the camera captures an image of the scale.

The scale may be disposed on an outer periphery of the roller and in contact with the roller along a roller axis.

When bringing the scale into contact with the roller, by rotation or compound restricted movement combining rotation and translational movement of the scale holding unit holding the scale, a roller contact position and a retracted position may be established. When the sheet is being produced, the scale may be retracted from the roller. When calibration is being performed, the scale may be moved onto the roller.

The scale holding unit may include a counterbalance. The camera may be disposed so that an image capturing direction of the camera is at an arbitrary position with respect to a rotational direction of the roller. The scale may be configured so that torque by gravity or a torsion spring in the scale holding unit causes the scale to move onto the roller with respect to a scale contact direction on the roller corresponding to a position of the camera.

The scale holding unit may be automatically switched, either remotely or automatically in a programmable manner, by using an actuator including at least one of rotary solenoid, a rotary cylinder, a gas spring, a motor, and a linear-motion cylinder.

The scale may be bowed with respect to an axis of the roller so as to be elevated at a center of the scale, the scale coming into contact with the roller at the center of the scale, and the scale coming into overall contact with the roller without a gap, by deformation caused by rotational torque.

A spacer including an element such as one or a combination of a spring, a plunger, a sponge, a rubber sheet, or a shim may be disposed between a scale supporting frame included in the scale holding unit and the scale so as to elevate a center of the scale.

A protective tape including an element such as a resin sheet or rubber may be adhered to a surface of the scale, preventing direct contact between the scale and the roller.

The scale holding unit may include a shock-absorbing mechanism including an element such as a rotary spring or shock absorber, a shock-absorbing spring, a gas spring, or a friction resistance generator (torque hinge).

A reflector plate may be disposed along a lengthwise direction of a scale supporting frame included in the scale holding unit. Direct light emitted from an illuminating member and light reflected from the reflector plate may illuminate the roller from both sides.

A scale supporting frame included in the scale holding unit may be formed by a reflective member. Direct light emitted from an illuminating member and light reflected from the reflective member may illuminate the roller from both sides.

Magnification compensation may be done for a thickness of the scale when the camera captures an image of the scale.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1A:
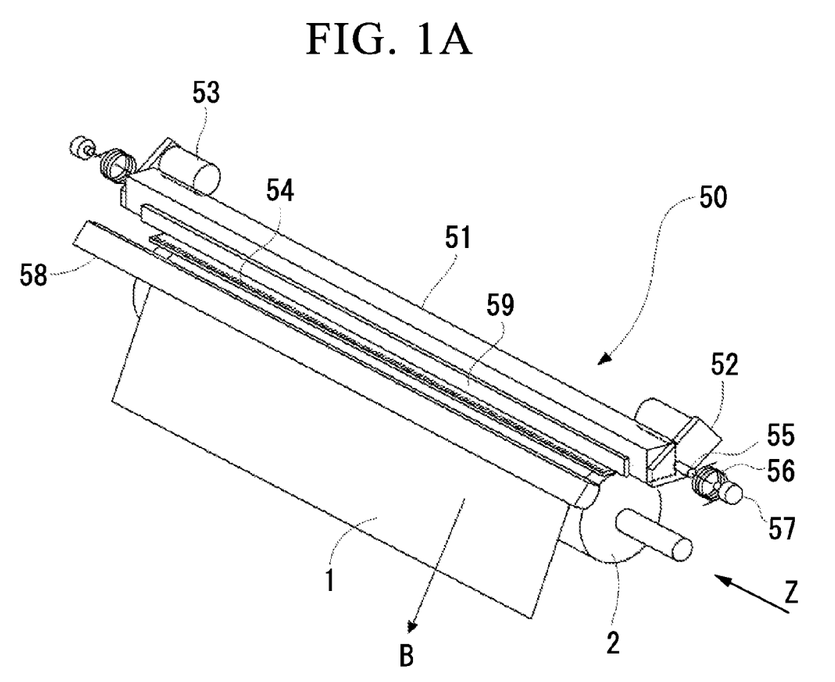
FIG. 1A is an oblique view of main parts of a coating dimension measurement apparatus in accordance with a first preferred embodiment of the present invention.
Figure 1B:
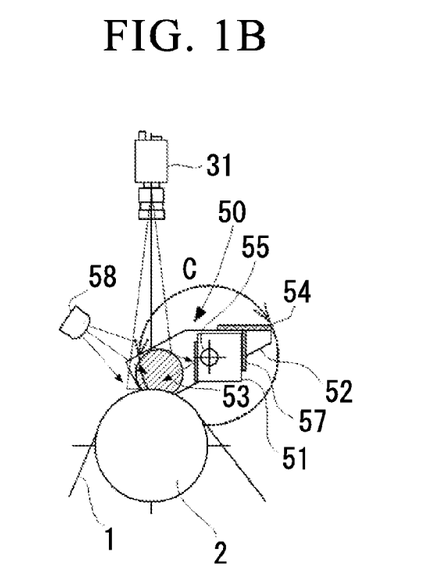
FIG. 1B is a view in a Z direction of FIG. 1A showing image capturing of a coated part on a sheet in the coating dimension measurement apparatus in accordance with the first preferred embodiment of the present invention.
Figure 1C:
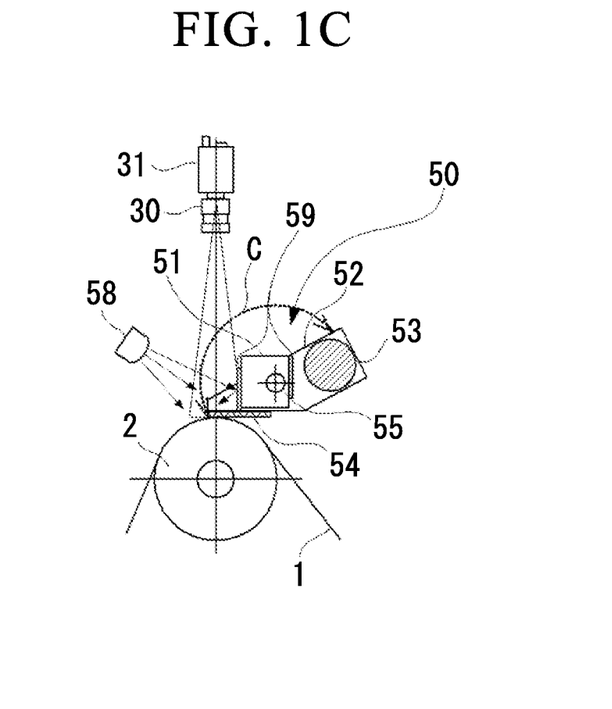
FIG. 1C is a view in the Z direction of FIG. 1A showing a condition in which calibration is performed by making contact onto a roller with a scale (straight scale) in the coating dimension measurement apparatus in accordance with the first preferred embodiment of the present invention.

A first preferred embodiment of the present invention will be described in detail below, using the drawings. FIG 1A is an oblique view of the main parts of a coating dimension measurement apparatus in accordance with the first preferred embodiment of the present invention. FIG. 1B is a view in the Z direction of FIG. 1A showing the image capturing of the coated part on a sheet 1 in the coating dimension measurement apparatus in accordance with the first preferred embodiment of the present invention. FIG. 1C is a view in the Z direction of FIG. 1A showing the condition in which calibration is performed by making contact onto the roller 2 with a scale (straight scale) 54 in the coating dimension measurement apparatus in accordance with the first preferred embodiment of the present invention.

In FIG 1A to FIG. 1C, the roller 2 is rotated by a transport means (not shown), the rotation of the roller 2 causing the sheet 1 to be transported in the direction of the arrow B along the outer periphery of the roller 2. The sheet 1 is an object to be measured.

The scale holding unit 50 includes scale supporting frame 51, plate-like holding brackets 52, counterbalances 53, and a thin-plate scale (straight scale) 54. The scale supporting frame 51 has a rectangular cross-section and is formed to have a length that is longer than the length of the roller 2 in the axial direction and supports the scale 54. The plate-like holding brackets 52 are fixed to each end of the scale supporting frame 51. The counterbalances 53 have a prescribed weight and are fixed in the vicinity of the end parts of the holding brackets 52. The thin-plate scale 54 is fixed to one surface of the scale supporting frame 51.

The scale 54 is one that has been calibrated by a public measurement organization, and is fixed so that the scale part thereof extends outward from the scale supporting frame 51 in an eave-like manner.

One end each of a rotating shaft 55 is fixed to the holding brackets 52 that are fixed to both ends of the scale supporting frame 51. A torsion spring 56 and a rotary damper 57 that restrict the rotation of the rotating shafts 55 are provided at the other ends of the rotating shafts 55.

Reflector plates 59 are fixed to each of the opposing surfaces of the rectangular scale supporting frame 51, these being fixed to surfaces that are perpendicular with respect to the scale 54 that extends outward in an eave-like manner from the scale supporting frame 51.

As shown in FIG. 1B and FIG. 1C, at least one camera 31 is disposed above the roller 2. A bar illuminator 58 is disposed at a position so that a shadow does not fall on the sheet 1 on the roller 2 and the scale divisions part of the scale 54.

Also, although torsion springs 56 and rotary dampers 57 are disposed on the rotating shafts 55 of the scale holding unit 50 in the example of figures, a shock-absorbing mechanism including an element such as shock absorber, a shock-absorbing spring, a gas spring, or a friction resistance generator (torque hinge) may be used.

Also, although not shown in the drawings, the rotating shafts 55 of the scale holding unit 50 can be rotated by an actuator including an element such as a rotary solenoid, a rotary cylinder, a gas spring, a motor, or a linear-motion cylinder, and can be switched either remotely or automatically in a programmable manner.

In the above-described constitution, FIG. 1B shows the position of the scale holding unit 50 when a coated part is measured, this being the condition in which the scale 54 is retracted. In this condition, the cameras 31 capture the surface of the sheet 1, and an imaging processing apparatus (not shown) measures the dimensions of the coated location on the sheet 1 being measured. When this is done, light from the bar illuminator 58 is made to strike the surface of the roller 2 that is to be captured, directly and as light reflected from the reflector plates 59, without causing a shadow.

FIG. 1C shows the condition in which the scale holding unit 50 is swung 180 degrees in the direction of the arrow C, placing the scale divisions of the scale 54 over the roller 2, this being the calibration position. When swinging the scale holding unit 50 to bring the scale 54 into contact with the roller 2, the torque of the counterbalance 53 and the internal torsion spring 56 causes the scale 54 to come into contact onto the roller 2 without imparting a shock. Also, if the rear side of the scale 54 (the side that makes contact with the roller 2) has a soft resin such as a Teflon (registered trademark) tape or the like applied thereto, it is possible to prevent shock when contact is made with the roller 2.

In this condition, the cameras 31 capture the scale division part of the scale 54, and the dimensional measurement is made by an imaging processing apparatus (not shown). When this is done, light from the bar illuminator 58 is made to strike the surface of the scale divisions to be captured, directly and as light reflected from the reflector plates, without causing a shadow.

In capturing an image of the scale divisions when performing calibration, because the distance from the camera 31 is shortened by the amount of the thickness of the scale 54 compared with when capturing the sheet 1, magnification compensation is done when the image is captured.

The above-described constitution implements a coating dimension measurement apparatus enabling simple calibration, without damage to the roller 2 by the scale 54, by just rotating the scale holding unit 50.

Although the relative positions of the cameras is important when capturing images with a plurality of cameras, even if the cameras are held fixed, there is no guarantee that loose screws or inadvertent contact will not disturb the fixed positions. For this reason, it is necessary to perform periodic checks. However, because it is sufficient to just rotate the scale holding unit 50, calibration can be easily performed.

Figure 2:
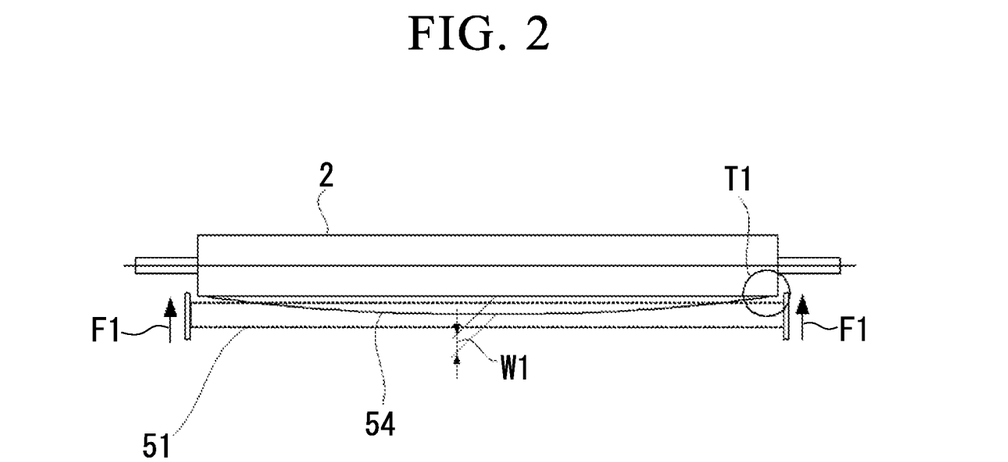
FIG. 2 is a diagram showing form of a scale supporting frame and a roller in the coating dimension measurement apparatus in accordance with the first preferred embodiment of the present invention.

FIG. 2 is a diagram showing, in exaggerated, form the relationship between the scale supporting frame 51 and the roller 2, in the condition in which the sheet 1 is in contact with the lower side of the roller 2. FIG. 2 shows the case in which there is 180 degrees of rotation, including the sheet 1, the roller 2, the scale supporting frame 51, the cameras 31, the illuminators 58, and the scale holding unit 50).

In such a case, the weight of the scale supporting frame 51 itself causes sagging of the scale 54, so that a gap W1 occurs at the center part thereof. The scale 54 pushes the roller 2 by a pushing force F1 at both sides thereof. Thereby, the scale 54 and the roller 2 are contact with each other at both sides thereof (shown at a circle T1).

FIG. 3A to FIG. 3D are diagrams showing prevention of the sagging at the center part as noted above.

Figure 3A:
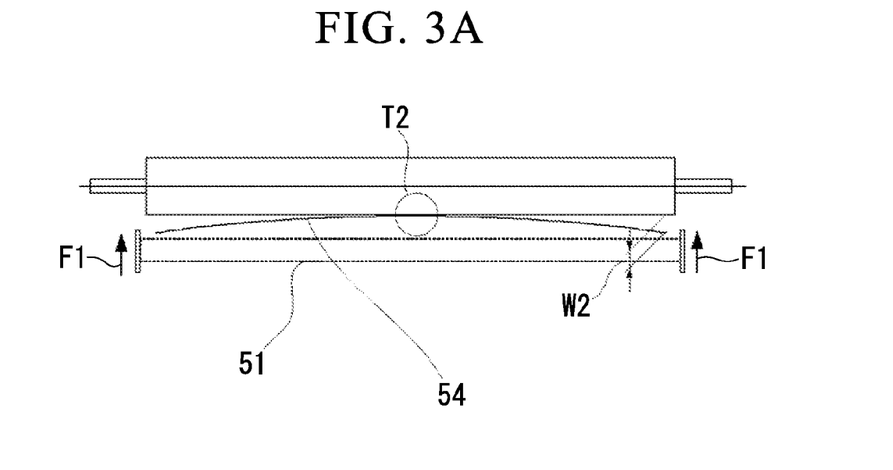
FIGS. 3A to 3D are diagrams showing other embodiments when a spacer is inserted between a scale supporting frame and a scale so as to adjust the height of the scale.

FIG. 3A is a diagram showing an embodiment when the scale 54 itself is deformed beforehand to elevate the center part. The scale 54 pushes the roller 2 by the pushing force F1 at both sides thereof. Thereby, the scale 54 and the roller 2 are contact with each other at the center part thereof (shown at a circle T2). The scale 54 is deformed along the roller 2 and contact closely with the roller 2. Thereby, a gap W2 at both sides thereof becomes disappeared.

Figure 3B:
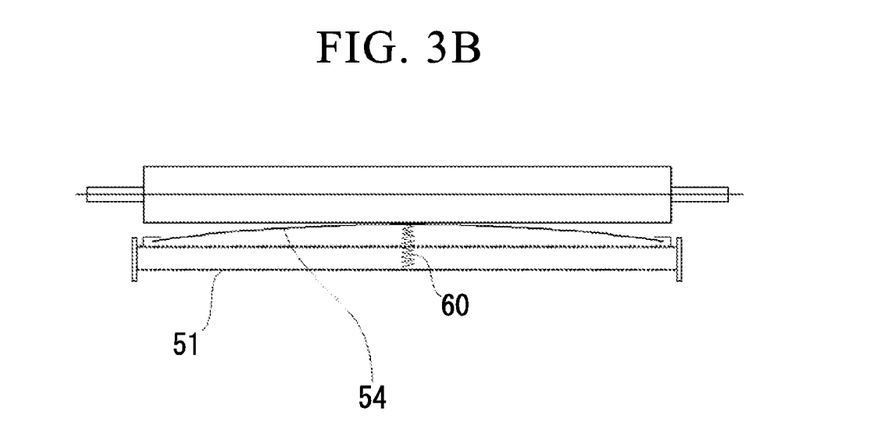

FIG. 3B is a diagram showing an embodiment when a spring, a plunger, or the like 60 are used to press on the center part of the scale 54.

Figure 3C:
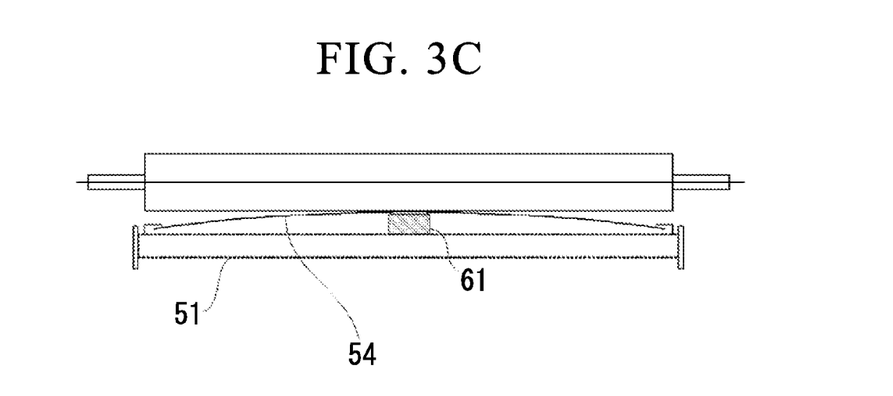

FIG. 3C is a diagram showing an embodiment when a sponge, a rubber sheet, or the like 61 are inserted at the center part between the scale supporting frame 51 and the scale 54.

Figure 3D:
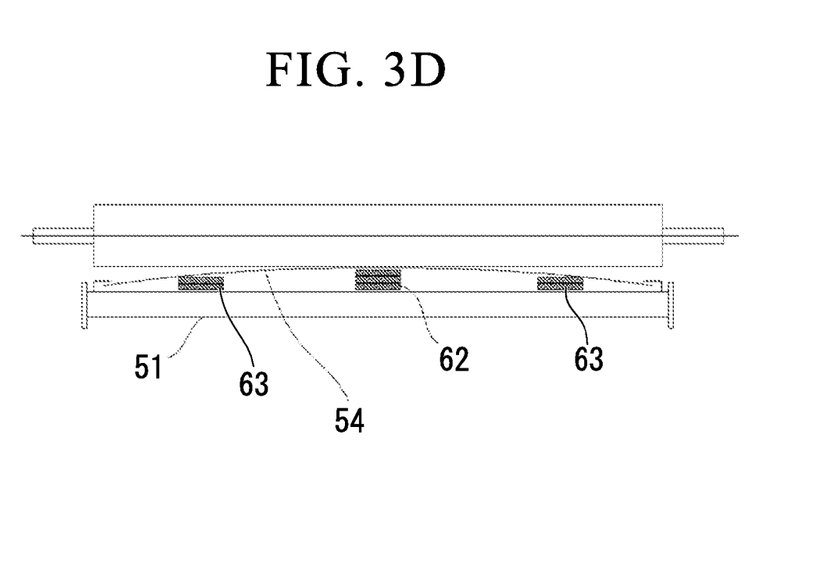

FIG. 3D is a diagram showing an embodiment when shim 62 is inserted to elevate the center part of the scale 54 and slims 63 are inserted to make both ends of the scale 54 slightly lower than the center part thereof.

Although FIG. 2 and FIG. 3A to FIG. 3D show the case in which there is rotation of 180 degrees to below the roller, the same would apply regardless of the angle of rotation.

If deformation is done beforehand to elevate the center part of the scale, because the scale is in contact along the roller, a gap does not occur.

There may be a plurality of cameras, and what is formed on the sheet is not restricted to being a coating, but can also be printing on the sheet.

Also, although in the present embodiment the constitution is such that, in bringing the scale into contact with the roller, the scale holding unit that holds the scale is rotated, compound movement that combines rotation with translational movement may be used to establish a roller contact position and a retracted position, with the scale retracted from the roller when production is done.

Also, although FIG. 1 shows a bar illuminator, a surface illuminator or point illuminators as shown in the conventional example of FIG. 5 may be used.

In the preferred embodiment of the present invention, a scale holding unit that holds a scale over a roller that transports the sheet is disposed and is positioned so as to enable free insertion and removal thereof, wherein the scale is disposed outside the image capturing range when capturing an image of the scale, and wherein the scale is disposed on the outer periphery of the roller and in contact with the roller along the roller axis when performing a calibration operation.

In the preferred embodiment of the present invention, when bringing the scale into contact with the roller, by rotation or compound restricted movement combining rotation and translational movement of the scale holding unit holding the scale, a roller contact position and a retracted position are established, with the scale being retracted from the roller during production and the scale being moved onto the roller during calibration.

In the preferred embodiment of the present invention, the scale holding unit has a counterbalance, wherein torque by gravity or an internal spring causes movement onto the roller with respect to the scale contact direction corresponding to the attitude of the scale holding unit, and wherein, by enabling remote or automatically programmable switching by an actuator including an element such as rotary solenoid, a rotary cylinder, a gas spring, a motor, or a linear-motion cylinder, it is possible to automate the moving of the scale up against the roller slowly.

In the preferred embodiment of the present invention, wherein a spacer including an element such as one or a combination of a spring, a plunger, a sponge, a rubber sheet, or a shim is disposed between the scale supporting frame of the scale holding unit and the scale so as to elevate the center of the scale, resulting in bowing of the scale with respect to an axis of the roller, the scale coming into contact with the roller at the center, and the scale coming into overall contact with the roller without a gap, by deformation caused by rotational torque, enabling imaging that is sharp, with no error.

In the preferred embodiment of the present invention, a protective tape including an element such as a resin sheet or rubber is adhered to a surface of the scale, and a shock-absorbing mechanism including an element such as a rotary spring or shock absorber, a shock-absorbing spring, a gas spring, or a friction resistance generator (torque hinge) is provided in the scale holding unit, enabling a soft contact, so that there is no mutual damage between the scale and the roller.

In the preferred embodiment of the present invention, a reflector plate is disposed along the lengthwise direction of the scale supporting frame of the scale holding unit, wherein the scale supporting frame itself is formed by an illuminating member, so that shadows on the roller are eliminated, thereby enabling sharp imaging.

In the preferred embodiment of the present invention, magnification compensation is done for the thickness of the scale when the camera captures an image of the scale, thereby enabling elimination of errors in imaging the sheet and scale positions.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A coating dimension measuring apparatus comprising:
a camera that is positioned at a prescribed position distanced from a sheet to capture an image of a coating dimension of the sheet;
a roller configured to transport the sheet;
a scale that is disposed along a lengthwise direction of the roller to perform numerical calibration of the coating dimension;
a scale holding unit configured to hold the scale over the roller, the scale holding unit being disposed so as to enable free insertion and removal of the scale,
the scale holding unit comprising a scale supporting unit configured to support the scale, holders fixed to each end of the scale supporting unit, and rotating shafts, one end of each of the rotating shafts being fixed to one of the holders,
wherein the scale is configured to be moved in a direction approaching a surface of the roller to be disposed on the roller or in a direction away from the surface of the roller to be disposed outside an image capturing range of the camera by swinging the scale holding unit around the rotating shaft.

2. The coating dimension measurement apparatus according to claim 1, wherein
the scale is disposed outside an image capturing range when the camera captures an image of the sheet, and is disposed on the roller only when the camera captures an image of the scale.

3. The coating dimension measurement apparatus according to claim 1, wherein
the scale is disposed on an outer periphery of the roller and in contact with the roller along a roller axis.

4. The coating dimension measurement apparatus according to claim 1 wherein,
when bringing the scale into contact with the roller, by rotation or compound restricted movement combining rotation and translational movement of the scale holding unit holding the scale, a roller contact position and a retracted position are established,
when the sheet is being produced, the scale is retracted from the roller, and
when calibration is being performed, the scale is moved onto the roller.

5. The coating dimension measurement apparatus according to claim 1, wherein
the scale holding unit includes a counterbalance,
the camera is disposed so that an image capturing direction of the camera is at an arbitrary position with respect to a rotational direction of the roller, and
the scale is configured so that torque by gravity or a torsion spring in the scale holding unit causes the scale to move onto the roller with respect to a scale contact direction on the roller corresponding to a position of the camera.

6. The coating dimension measurement apparatus according to claim 1, wherein
the scale holding unit can be automatically switched, either remotely or automatically in a programmable manner, by using an actuator including at least one of rotary solenoid, a rotary cylinder, a gas spring, a motor, and a linear-motion cylinder.

7. The coating dimension measurement apparatus according to claim 1, wherein
the scale is bowed with respect to an axis of the roller so as to be elevated at a center of the scale, the scale coming into contact with the roller at the center of the scale, and the scale coming into overall contact with the roller without a gap, by deformation caused by rotational torque.

8. The coating dimension measurement apparatus according to claim 1, wherein
a spacer including an element such as one or a combination of a spring, a plunger, a sponge, a rubber sheet, or a shim is disposed between a scale supporting frame included in the scale holding unit and the scale so as to elevate a center of the scale.

9. The coating dimension measurement apparatus according to claim 1, wherein
a protective tape including an element such as a resin sheet or rubber is adhered to a surface of the scale, preventing direct contact between the scale and the roller.

10. The coating dimension measurement apparatus according to claim 1, wherein
the scale holding unit includes a shock-absorbing mechanism including an element such as a rotary damper or shock absorber, a shock-absorbing spring, a gas spring, or a friction resistance generator (torque hinge).

11. The coating dimension measurement apparatus according to claim 1, wherein
a reflector plate is disposed along a lengthwise direction of a scale supporting frame included in the scale holding unit, and
direct light emitted from an illuminating member and light reflected from the reflector plate illuminate the roller from both sides.

12. A coating dimension measuring apparatus comprising:
a camera that is positioned at a prescribed position distanced from a sheet to capture an image of a coating dimension of the sheet;
a roller configured to transport the sheet;
a scale that is disposed along a lengthwise direction of the roller to perform numerical calibration of the coating dimension; and
a scale holding unit configured to hold the scale over the roller, the scale holding unit being disposed so as to enable free insertion and removal of the scale,
wherein
a scale supporting frame included in the scale holding unit is formed by a reflective member, and
direct light emitted from an illuminating member and light reflected from the reflective member illuminate the roller from both sides.

13. A coating dimension measuring apparatus comprising:
a camera that is positioned at a prescribed position distanced from a sheet to capture an image of a coating dimension of the sheet;
a roller configured to transport the sheet;
a scale that is disposed along a lengthwise direction of the roller to perform numerical calibration of the coating dimension; and
a scale holding unit configured to hold the scale over the roller, the scale holding unit being disposed so as to enable free insertion and removal of the scale,
wherein magnification compensation is done for a thickness of the scale when the camera captures an image of the scale.

* * * * *